Aug. 27, 1957     L. L. GENUIT     2,804,583
DIRECT CURRENT MOTOR SPEED CONTROL SYSTEM
Filed Oct. 18, 1956                     2 Sheets-Sheet 1
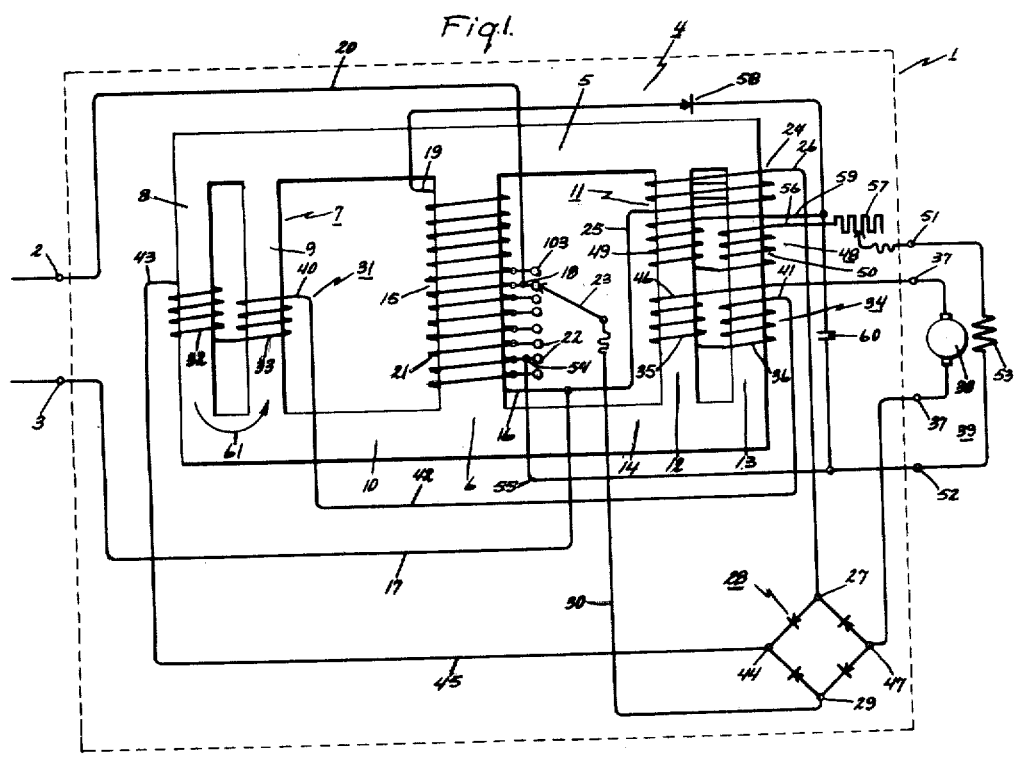
Inventor:
Luther L. Genuit,
by *[signature]*
His Attorney.

United States Patent Office 2,804,583
Patented Aug. 27, 1957

2,804,583

DIRECT CURRENT MOTOR SPEED CONTROL SYSTEM

Luther L. Genuit, Fort Wayne, Ind., assignor to General Electric Company, a corporation of New York Application October 18, 1956, Serial No. 616,867

13 Claims. (Cl. 318—332)

This invention relates to control systems for direct current motors and more particularly to a system for operating a direct current motor and for selectively controlling the speed thereof from an alternating current source.

There are many applications for electric motors in which variable speed is highly desirable, for example, in the operation of machine tools, home work shop equipment, etc. The common types of alternating current motors, i. e., induction and synchronous motors cannot be operated at varying speeds when supplied with alternating current of fixed frequency. Direct current motors on the other hand provide the desired variation, however, alternating current power is generally the only type now supplied by utilities. In order, therefore, to operate direct current motors from an alternating current source of power, numerous control systems have been devised including the Ward-Leonard system and various systems including Thyratron tubes. These systems have been most advantageously employed for operating large direct current motors; the costs involved have generally precluded their use on direct current motors in the smaller sizes. It is therefore desirable to provide a system for operating a direct current motor and for selectively controlling the speed thereof on an alternating current source, such a system being sufficiently inexpensive to permit its general use with small direct current motors. The cost element involved will preclude the use of rotating machines, as in the Ward-Leonard type systems, and also the use of Thyratron type tubes, since these tubes themselves are expensive and further since the use of a half-wave rectifying circuit requires de-rating the motor, e. g., using a nominally one-half horsepower rated motor to obtain one-third horsepower. It is therefore apparent that to satisfy the economic requirement, a control system utilizing static magnetic components must be provided. There is an additional requirement which must be met by such a system, namely the provision of good regulation of motor speed for changes in load, i. e., at any given speed setting, the motor speed should remain relatively constant over wide changes in load. The speed of a direct current motor is conventionally represented by the formula $$n = \frac{V - I_a R_a}{K \phi N}$$

where $n$ is speed, $V$ is the line voltage, $I_a$ the armature current, $R_a$ the armature resistance, $\phi$ the field flux and $K$ and $N$ are constants for any given motor. The factor $I_a R_a$ is referred to as "armature drop" and it will be seen that it is directly proportional to armature load current. It is thus seen that the motor speed is directly proportional to the net voltage available, i. e., line voltage minus voltage drop, and inversely proportional to field flux. In the case of a separately excited shunt wound motor where field flux remains constant, it will be seen that the motor speed on any given line voltage will decrease with increasing load. In order therefore to provide a direct current motor speed control system with good speed regulation for exchanges in load current, it is necessary to compensate for armature drop. There is thus added to the previously set forth set requirements the additional requirement that the control system compensate for armature drop.

Circuits for operating direct current motors and for controlling the speed thereof from an alternating current source and which compensate at least in some degree for armature drop have been proposed in the past. These circuits in general include an adjustable output voltage auto-transformer for selecting the desired operating voltage and speed, a rectifier for supplying armature current and a saturable core reactor having a saturating winding energized by armature current. These arrangements have, however, required as a minimum two separate inductive devices, i. e., the transformer and at least one saturable core reactor. It is, therefore, desirable to provide a system providing the same performance characteristics as such previous systems but which utilizes only one inductive device. Such a system is disclosed in application Serial No. 60,078, filed November 2, 1956, of M. W. Sims and assigned to the assignee of the present application. In that system, a transformer is provided having a core with a main magnetic path and a shunt magnetic path. A winding is arranged on the core linking both the main magnetic path and the shunt magnetic path and having at least a part thereof adapted to be connected across the alternating current source, thus forming the primary winding. A secondary winding is positioned on the core linking only the main magnetic path and means are provided for obtaining a selectively variable voltage output from the transformer. A rectifier is provided having its input connected in circuit with the secondary winding. The output of the rectifier is connected in circuit with the motor armature and a direct current saturating winding arranged on the core linking only the shunt magnetic path so that the direct current saturating winding is energized in response to armature current. It is thus seen that with minimum armature current flowing with no load on the motor, the flux produced by the primary winding will divide substantially equally between the main and shunt magnetic paths. As the motor load increases, the armature current will correspondingly increase thus increasingly saturating the shunt magnetic path and causing a corresponding increase in its reluctance. The flux produced by the primary winding will therefore be proportionally diverted from the shunt magnetic path to the main magnetic path thereby causing an increase in the voltage produced by the secondary winding and therefore an increase in the voltage applied to the motor armature thereby to compensate for armature drop.

It has been found that in the circuit of the aforesaid application Serial No. 620,078, and also in the prior systems referred to above, that the increase in boosting voltage responsive to increasing armature current is not entirely adequate fully to compensate for armature drop. This is due to the fact that in the above described circuits, varying reactance is included in the motor armature circuit and thus the boosting voltage must overcome not only the armature resistance, but also a reactance drop.

It is, therefore, desirable to provide a system of the type hereunder consideration which not only utilizes only a single inductive device, but which also will provide more adequate compensation for armature drop than has been provided by previous systems.

It is, therefore, an object of this invention to provide an improved control system for operating a direct current motor and for selectively controlling the speed thereof from a source of alternating current.

Another object of this invention is to provide an improved direct current motor speed control system incorporating a single inductive device.

A further object of this invention is to provide an improved direct current motor speed control system incorporating a single inductive device and providing more adequate compensation for armature drop than previous systems.

Further objects and advantages to this invention will become apparent from the following description and the accompanying drawings and the features of novelty which characterize this invention will be pointed out with particularity in the claims annexed to and forming a part of this specification.

This invention in its broader aspects provides a control system for operating a direct current motor and for selectively controlling the speed thereof from alternating current source, the system comprising a transformer having a core with a main magnetic path and a shunt magnetic path. First winding means is provided on the core linking both the main and shunt magnetic paths and having at least a part thereof adapted to be connected to a source of alternating current. Secondary winding means are provided on the core linking only the main magnetic path and means are provided for obtaining a selectively variable output voltage from the transformer thereby to select the motor speed. Rectifying means are provided having its input connected in circuit with the secondary winding means. A direct current saturating winding is arranged on the core linking only the shunt magnetic path and another direct current saturating winding is arranged on the core linking only the main magnetic path. The output of the rectifier is connected in circuit with the direct current saturating windings and the motor armature so that the saturating windings are energized in response to motor armature current. An additional saturating winding is provided on the core linking only the main magnetic path and opposing the other saturating winding which links that path, this additional saturating winding having a fixed direct current biasing voltage impressed thereon. In this arrangement, with minimum load on the motor and thus minimum armature current flowing, the fixed bias on the additional direct current saturating winding substantially saturates the main magnetic path so that substantially all of the flux produced by the first winding traverses the shunt magnetic path and therefore minimum boosting voltage is induced in the secondary winding. As the load on the motor is increased and thus armature current increases the increased flow of current in the saturating winding linking the shunt magnetic path will increasingly saturate that path thereby increasing its reluctance whereas the increased current in the saturating winding linking the main magnetic path causes that winding increasingly to buck the effect of the additional saturating winding thereby decreasing the degree of saturation of the main magnetic path and thus its reluctance. An increasing amount of flux is therefore diverted from the shunt magnetic path to the main magnetic path thereby increasing the boosting voltage induced in the secondary winding. It is thus seen that with the system of this invention, a change from minimum to maximum armature current is accompanied by a change from substantially zero to substantially maximum boosting voltage whereas in the system of the aforesaid application Serial No. 620,078, a corresponding change in armature current produces only a change from half boosting voltage to full boosting voltage. This greatly increased change in boosting voltage with change in armature current produces a greatly increased compensation for armature drop.

In the drawings,

Fig. 1 is a schematic illustration showing the preferred embodiment of the improved motor speed control circuit of this invention;

Fig. 2 is a set of speed torque curves comparing the performance of the circuit of Fig. 1 with a conventional shunt-wound direct current motor.

Figure 3:
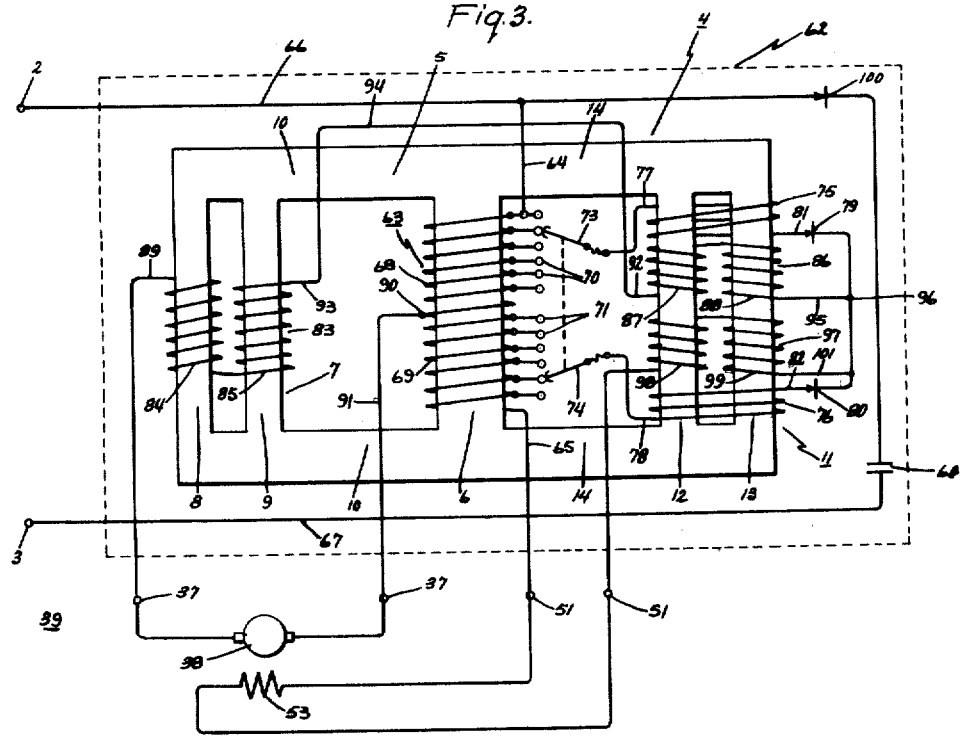
Fig. 3 is another schematic illustration showing another embodiment of the improved motor speed control system of this invention.

Referring now to Fig. 1, the improved direct current motor speed control system of this invention, generally identified as 1, includes a pair of input terminals 2 and 3 adapted to be connected to a suitable external source of single phase alternating current, such as a 120 volts, 60 cycles. A transformer 4 is provided having a core 5. Core 5 has a center leg 6, a shunt leg 7 having two parallel spaced apart sections 8 and 9 joined to the center leg 6 by side portions 10, and a main leg 11 having two parallel spaced apart sections 12 and 13 joined to the main leg 6 by side portions 14. The center leg 6, sections 8 and 9 of shunt leg 7 and side portions 10 constitute a shunt magnetic path while the sections 12 and 13 of main leg 11 and side portions 14 together with center leg 6 constitute a main magnetic path.

A first winding 15 is provided arranged on the center leg 6 and therefore linking both the shunt magnetic path and the main magnetic path. Winding 15 has one end 16 connected to input terminal 3 by conductor 17, and a point 18 intermediate end 16 and its other end 19 connected to input terminal 2 by conductor 20. The portion of winding 15 intermediate end 16 and point 18 therefore constitutes a primary winding 21. It will be readily apparent that the portion of winding 15 included in primary winding 21 is a matter of design and in any particular system, all of the winding 15 or some lesser part thereof may constitute the primary winding.

Winding 15 is provided with a plurality of taps 22 which cooperate with a tap switch 23 to provide a selectively variable voltage and the desired speed setting of the motor. A secondary winding 24 is arranged on main leg 11 of core 5 embracing both sections 12 and 13 thereof and having its one end 25 connected to end 16 of primary winding 21 and its other end 26 connected to input terminal 27 of bridge rectifier 28. The other input terminal 29 of bridge rectifier 28 is connected to tap switch 23 by conductor 30. It will thus be seen that the secondary winding 24 is connected to winding 15 in autotransformer relationship.

A direct current saturating winding 31 is provided having two sections 32 and 33 respectively arranged on sections 8 and 9 of shunt leg 7 of core 5 and another direct current saturating winding 34 is provided having sections 35 and 36 respectively arranged on sections 12 and 13 of main leg 11 of core 5. A pair of output terminals 37 are provided adapted to be connected to the armature 38 of shunt-wound direct current motor 39. Winding sections 32 and 33 of direct current saturating winding 31 are serially connected as are winding sections 35 and 36 of direct current saturating winding 34 and one end 40 of direct current saturating winding 31 is connected to one end 41 of direct current saturating winding 34 by conductor 42. The other end 43 of direct current saturating winding 31 is connected to one output terminal 44 of bridge rectifier 28 by conductor 45 while the other end 46 of direct current saturating winding 34 is connected to one of the direct current motor armature output terminals 37, the other output terminal 37 being connected to the other output terminal 47 of bridge rectifier 28. It is thus seen that the output terminals 44 and 47 of bridge rectifier 28 are serially connected with the direct current saturating windings 31 and 34 across the motor armature output terminals 37.

An additional direct current saturating winding 48 is provided having two sections 49 and 50 respectively arranged on sections 12 and 13 of main leg 11 of core 5, direct current saturating winding 48 being arranged to oppose direct current saturating winding 34. A pair of direct current motor field winding output terminals 51 and 52 are provided adapted to be connected to shunt field winding 53 of motor 39. Output terminal 52 is connected to point 54 on winding 15 by conductor 55 while output terminal 51 is connected to end 56 of direct current saturating winding 48 by variable resistor 57. A half-wave rectifier 58 is connected in series between end 19 of winding 15 and the other end 59 of direct current saturating winding 48. It is thus seen that half-wave rectifier 58, direct current saturating winding 48 and direct current motor field winding output terminals 51 and 52 are serially connected across that part of winding 15 defined by end 19 and point 54, and that rectifier 58 supplies a fixed direct current voltage for energizing direct current saturating winding 48 and shunt field winding 53 of motor 39. A capacitor 60 is connected across direct current saturating winding 48 and direct current motor field winding output terminals 51 and 52 as shown and serves to filter the ripple in and increase the magnitude of the direct current voltage supplied to the direct current saturating winding 48 and shunt field winding 53 caused by the half-wave rectifier 58.

The operation of the improved direct current motor speed control system of Fig. 1 will now be described. Assuming minimum load on motor 39 and thus minimum armature current flowing, minimum current will be flowing in direct current saturating windings 31 and 34. Shunt leg 7 will thus be unsaturated and therefore have minimum reluctance. However, bias current provided by half-wave rectifier 58 is flowing in sections 49 and 50 of direct current saturating winding 48 which opposes direct current saturating winding 34 and thus substantially saturates sections 12 and 13 of main leg 11. Main leg 11 thus has relatively high reluctance compared with the reluctance of shunt leg 7 and substantially all of flux produced by winding 15 will traverse sections 8 and 9 of shunt leg 7. It will be readily apparent that by virtue of the arrangement of sections 32 and 33 of direct current saturating winding 31 on sections 8 and 9 of shunt leg 7, the alternating current voltages induced in sections 32 and 33 will mutually cancel whereas the unidirectional flux produced by these sections will circulate in the two sections 8 and 9 of shunt leg 7 as shown by the arrow 61. Likewise, any alternating current voltages tending to be induced in sections 49 and 50 of direct current saturating winding 48 and sections 35 and 36 of direct current saturating winding 34 will mutually cancel whereas the unidirectional flux produced by these windings will circulate in sections 12 and 13 of main leg 11. With substantially all of the flux provided by winding 15 traversing shunt leg 7 and substantially none of this flux traversing main leg 11 and thus linking secondary winding 24, minimum boosting voltage will be induced in secondary winding 24 and thus the voltage applied to armature 38 will be substantially that appearing across that part of winding 15 selected by tap switch 23.

As the load on motor 39 increases and the armature current correspondingly increases, increased current will flow in direct current saturating windings 31 and 34. This increased armature current flowing in sections 32 and 33 of the direct current saturating winding 31 increasingly saturates sections 8 and 9 of shunt leg 7, thus increasing the reluctances of these sections while at the same time the increased current flowing in sections 35 and 36 of direct current saturating winding 34 increasingly opposes the effect of sections 49 and 50 of direct current saturating winding 48 so that the degree of saturation and thus the reluctance of main leg 11 is increasingly reduced. It is thus seen that an increase in armature current is accompanied by a two fold effect, an increase in the reluctance of shunt leg 7 and an accompanying simultaneous decrease in the reluctance of main leg 11 of core 5, so that the flux produced by winding 15 is increasingly diverted from shunt leg 7 to main leg 11 thereby causing an increase in the voltage induced in secondary winding 24. This boosting voltage induced in winding 24 is added to the voltage selected from winding 15 by tap switch 23 by virtue of the autotransformer connection and substantially compensates for the increased armature drop in armature 38.

It will now be seen that in accordance with the improved speed system of this invention, the reluctances of the two magnetic paths, i. e., the shunt magnetic path and the main magnetic path are simultaneously and inversely varied, this variation being cumulative so that the resulting boosting voltage is proportional to armature current.

A system has been assembled in accordance with Fig. 1 for operating a ½ horsepower shunt wound direct current motor. In this system, core 5 of transformer 4 was formed of laminations with a stack height of 1½ inches. Center leg 6 was 1⅛ inches wide with sections 8 and 9 of shunt leg 7 and sections 12 and 13 of main leg 11 each being 9/16 inch wide. Side portions 10 and 14 were each 1⅛ inches wide and the over all core was 6¾ inches long and 5⅝ inches wide. Winding 15 had 350 turns of .0142 inch diameter wire from end 19 to tap 103 and 292 turns of .0679 inch wire from tap 103 to end 16. Eight speed selecting taps 22 were provided as shown. Sections 32 and 33 of direct current saturating winding 31 each had 128 turns of .0679 inch diameter wire while sections 35 and 36 of direct current saturating winding 34 each had 44 turns of .0605 inch diameter wire. Secondary winding 24 had 58 turns of .0508 inch diameter wire while sections 49 and 50 of .0508 inch diameter wire while sections 49 and 50 of direct current saturating winding 48 each had 1337 turns of .0142 inch diameter wire. Capacitor 60 had a capacitance of 40 microfarads. Germanium rectifiers were used for rectifiers 28 and 58.

Fig. 2 shows typical speed torque curves, i. e., motor speed plotted against armature current, obtained with the system of Fig. 1 described above (shown in solid lines) compared with comparable speed torque curves of the motor alone without the improved system of this invention (shown in dotted lines). It will be observed that the speed regulation of the motor, i. e., control of speed with incerasing armature current with the circuit of Fig. 1 is very greatly improved over the speed regulation of the same shunt excited motor operated without the improved system of this invention.

Referring now to Fig. 3, in which like elements are indicated by like reference numerals, the speed control system generally identified as 62 includes again input terminals 2 and 3, and a transformer 4 having a core 5 with a center leg 6, a shunt leg 7 having two sections 8 and 9, joined to center leg 6 by portions 10, and main leg 11 having sections 12 and 13 again joined to center leg 6 by side portions 14.

Here, winding 63 is arranged on center leg 6 and has its two extreme ends 64 and 65 respectively connected to input terminals 2 and 3 by conductors 66 and 67. Winding 63 is divided into two serially connected substantially identical parts 68 and 69 with part 68 having a plurality of taps 70 and part 69 having another plurality of taps 71. A pair of tap switches 72 and 73 are provided respectively cooperating with taps 70 and 71 on winding parts 68 and 69.

A pair of secondary windings 75 and 76 are provided respectively arranged on main leg 11 of core 5 embracing both sections 12 and 13. As in the case of the embodiment of Fig. 1, winding 63 on center leg 6 links both the shunt magnetic path including sections 8 and 9 of shunt leg 7 and side portions 10, and the main magnetic path including sections 12 and 13 of main leg 11 and side portions 14. Secondary windings 75 and 76 link only the main magnetic path and respectively have their ends 77 and 78 connected to tap switches 73 and 74. A pair of serially connected half-wave rectifiers 79 and 80 join the other ends 81 and 82 of secondary windings 75 and 76.

A direct current saturating winding 83 is provided having sections 84 and 85 respectively arranged on sections 8 and 9 of shunt leg 7 and it will thus be seen that direct current saturating winding 83 links only the shunt magnetic path. Another direct current saturating winding 86 is provided having sections 87 and 88 arranged on sections 12 and 13 of main leg 11 and it will thus be seen that direct current saturating winding 86 links only the main magnetic path. A pair of direct current motor armature output terminals 37 again provided adapted to be connected to armature 38 of shunt wound direct current motor 39. Sections 4 and 85 of direct current saturating winding 83 are again serially connected with end 89 being connected to one of the motor output terminals 37 being connected to midpoint 90 between parts 68 and 69 of winding 63 by a conductor 91. Sections 87 and 88 of direct current saturating winding 86 are also serially connected with end 92 being connected to end 93 of direct current saturating winding 83 by conductor 94. The other end 95 of direct current saturating winding 86 is connected to the midpoint 96 between half-wave rectifiers 79 and 80. It will now be seen that the direct current motor armature output terminals 37 are serially connected with direct current saturating windings 83 and 86 across the midpoint 96 between half-wave rectifiers 79 and 80, and the midpoint 90 between parts 68 and 69 of winding 63.

Another direct current saturating winding 97 is provided having two serially connected sections 98 and 99 arranged respectively on sections 12 and 13 of main leg 11 and thus links only the main magnetic path. A half-wave rectifier 100 serially connects end 64 of winding 64 with end 101 of direct current saturating winding 97. A pair of direct current motor shunt field winding output terminals 51 is again provided adapted to be connected to shunt field winding 53 of motor 39, one of the field output terminals 51 being connected to the other end 65 of winding 63 while the other field output terminal 51 is connected to the other end 102 of direct current saturating winding 97. The direct current saturating or bias winding 97 again opposes direct current saturating winding 86 and it will be seen that shunt field winding 53 and direct current saturating winding 97 are again serially energized by half-wave rectifier 100 from across winding 63. Capacitor 60 is again connected across direct current saturating winding 97 and shunt field winding 53.

The operation of the embodiment of Fig. 3 is identical to that of Fig. 1, the circuit of Fig. 3 being merely modified to utilize a center tapped rectifying system as opposed to the bridge rectifier system utilized in Fig. 1.

It will now be readily apparent that this invention provides an improved system for operating a direct current motor and for selectively controlling the speed thereof from an alternating current source, which system utilizes only a single inductive device and provides compensation for armature drop much superior to that provided by previous systems.

While I have described and illustrated specific embodiments of this invention, further modifications and improvements will occur to those skilled in the art. I desire that it be understood therefore that this invention is not limited to the specific forms shown and I intend in the appended claims to cover all modifications which do not depart from the spirit and scope of this invention.

What I claim as new and desire to secure by Letters Patent of the United States is:

1. A system for operating a direct current motor and for selectively controlling the speed thereof from an alternating current souce, said system comprising a transformer having a core, said core having a main magnetic path and a shunt magnetic path, first winding means on said core linking both said main and shunt magnetic paths, a pair of alternating current input terminals, said first winding means having at least a part thereof connected across said input terminals thereby forming a primary winding, secondary winding means on said core linking only said main magnetic path, means for obtaining a selectively variable output voltage from said transformer, rectifying means having its input connected in circuit with said secondary winding means, a first direct current saturating winding on said core linking only said shunt magnetic path, a second direct current saturating winding on said core linking only said main magnetic path, a pair of direct current motor armature output terminals, the output of said rectifying means and said direct current saturating windings being connected in circuit with said output terminals whereby said direct current saturating windings are energized in response to motor armature current, at least one additional direct current saturating winding on said core linking only said main magnetic path and opposing said second direct current saturating winding, and connections for impressing a fixed direct current voltage on said last-named direct current saturating winding.

2. A system for operating a direct current motor and for selectively controlling the speed thereof from an alternating current source, said system comprising a transformer having a core, said core having a main magnetic path and a shunt magnetic path, first winding means on said core linking both said main and shunt magnetic paths, a pair of alternating current input terminals, said first winding means having at least a part thereof connected across said input terminals thereby forming a primary winding, means for obtaining a selectively variable output voltage from said first winding means, secondary winding means on said core linking only said main magnetic path and connected in circuit with said means for obtaining a selectively variable voltage thereby forming an autotransformer connection of said secondary winding means to said primary winding means, rectifying means having its input connected in circuit with said secondary winding means, a first direct current saturating winding on said core linking only said shunt magentic path, a second direct current saturating winding on said core linking only said main magnetic path, a pair of direct current motor armature output terminals, the output of said rectifying means and said direct current saturating windings being connected in circuit with said output terminals whereby said direct current saturating windings are energized in response to motor armature current, at least one additional direct current saturating winding on said core linking only said main magnetic path and opposing said second direct current saturating winding, and connections for impressing a fixed direct current voltage on said last-named direct current saturating winding.

3. A system for operating a direct current motor and for selectively controlling the speed thereof from an alternating current source, said system comprising a transformer having a core, said core having a main magnetic path and a shunt magnetic path, first winding means on said core linking both said main and shunt magnetic paths, a pair of alternating current input terminals, said first winding means having at least a part thereof connected across said input terminals thereby forming a primary winding, said first winding means having a plurality of taps, tap switching means cooperating with said taps thereby to obtain a selectively variable voltage from said first winding means, secondary winding means on said core linking only said main magnetic path and connected in circuit with said tap switching means thereby forming an autotransformer connection of said secondary winding means to said primary winding means, rectifying means having its input connected in circuit with said secondary winding means, a first direct current saturating winding on said core linking only said shunt magnetic path, a second direct current saturating winding on said core linking only said main magnetic path, a pair of direct current motor armature output terminals, the output of said rectifying means and said direct current saturating windings being connected in circuit with said output terminals whereby said direct current saturating windings are energized in response to motor armature current, at least one additional direct current saturating winding on said core linking only said main magnetic path and opposing said second direct current saturating winding, and connections for impressing a fixed direct current voltage on said last-named direct current saturating winding.

4. A system for operating a direct current motor and for selectively controlling the speed thereof from an alternating current source, said system comprising a transformer having a core, said core having a main magnetic path and a shunt magentic path, first winding means on said core linking both said main and shunt magnetic paths, a pair of alternating current input terminals, said first winding means having at least a part thereof connected across said input terminals thereby forming a primary winding, secondary winding means on said core linking only said main magnetic path, means for obtaining a selectively variable output voltage from said transformer, first rectifying means having its input connected in circuit with said secondary winding means, a first direct current saturating winding on said core linking only said shunt magnetic path, a second direct current saturating winding on said core linking only said main magnetic path, a pair of direct current motor armature output terminals, the output of said rectifying means and said direct current saturating windings being connected in circuit with said output terminals whereby said direct current saturating windings are energized in response to motor armature current, at least one additional direct current saturating winding on said core linking only said main magnetic path and opposing said second direct current saturating winding, a pair of direct current motor field winding output terminals, and second rectifying means having its input connected to at least a part of said first winding means and having its output connected in circuit with said last-named direct current saturating winding and said last-named output terminals.

5. A system for operating a direct current motor and for selectively controlling the speed thereof from an alternating current source, said system comprising a transformer having a core, said core having a main magnetic path and a shunt magnetic path, first winding means on said core linking both said main and shunt magnetic paths, a pair of alternating current input terminals, said first winding means having at least a part thereof connected across said input terminals thereby forming a primary winding, secondary winding means on said core linking only said main magnetic path, means for obtaining a selectively variable output voltage from said transformer, rectifying means having its input connected in circuit with said secondary winding means, a first direct current saturating winding on said core linking only said shunt magnetic path, a second direct current saturating winding on said core linking only said main magnetic path, a pair of direct current motor armature output terminals, the output of said rectifying means and said direct current saturating windings being connected in series across said output terminals whereby said direct current saturating windings are energized by motor armature current, at least one additional direct current saturating winding on said core linking only said main magnetic path and opposing said second direct current saturating winding, and connections for impressing a fixed direct current voltage on said last-named direct current saturating winding.

6. A system for operating a direct current motor and for selectively controlling the speed thereof from an alternating current source, said system comprising a transformer having a core, said core having a main magnetic path and a shunt magnetic path, a first winding on said core linking both said main and shunt magnetic paths, a pair of alternating current input terminals, said first winding having at least a part thereof connected across said input terminals thereby forming a primary winding, a secondary winding on said core linking only said main magnetic path, means for obtaining a selectively variable voltage output from said transformer, a bridge rectifier having its input connected in circuit with said secondary winding, a first direct current saturating winding on said core linking only said shunt magnetic path, a second direct current saturating winding on said core linking only said main magnetic path, a pair of direct current motor armature output terminals, the output of said rectifier and said direct current saturating windings being connected in circuit with said output terminals whereby said direct current saturating windings are energized in response to motor armature current, at least one additional direct current saturating winding on said core linking only said main magnetic path and opposing said second direct current saturating winding, and connections for impressing a fixed direct current voltage on said last-named direct current saturating winding.

7. A system for operating a direct current motor and for selectively connecting the speed thereof from an alternating current source, said system comprising a transformer having a core, said core having a main magnetic path and a shunt magnetic path, a first winding on said core linking both said main and shunt magnetic paths, a pair of alternating current input terminals, said first winding having at least a part thereof connected across said input terminals thereby forming a primary winding, means for obtaining a selectively variable voltage from said first winding, a secondary winding on said core linking only said main magnetic path, a bridge rectifier having its input terminals connected in series with said secondary winding across said means for obtaining a selectively variable voltage thereby forming an auto-transformer connection of said secondary winding to said primary winding, a first direct current saturating winding on said core linking only said shunt magnetic path, a second direct current saturating winding on said core linking only said main magnetic path, a pair of direct current motor armature output terminals, the output terminals of said rectifier and said direct current saturating winding being connected in circuit with said output terminals whereby said direct current saturating windings are energized in response to motor armature current, at least one additional direct current saturating winding on said core linking only said main magnetic path and opposing said second direct current saturating winding, a pair of direct current motor field winding output terminals, another rectifying means having its input connected to at least a part of said first winding means and having its output connected in circuit with said last-named direct current saturating winding and said last-named output terminals.

8. A system for operating a direct current motor and for selectively controlling the speed thereof from an alternating current source, said system comprising a transformer having a core, said core having a main magnetic path and a shunt magnetic path, a first winding on said core linking both said main and shunt magnetic paths, a pair of alternating current input terminals, said first winding having one end thereof and a point intermediate its ends respectively connected to said input terminals thereby forming a primary winding, said winding having a plurality of taps, a tap switch cooperating with said taps thereby to obtain a selectively variable voltage from said first winding, a secondary winding on said core linking only said main magnetic path, a bridge rectifier having its input terminals connected in series with said secondary winding across said tap switch and a point on said primary winding thereby forming an auto-transformer connection of said secondary winding to said primary winding, a first direct current saturating winding on said core linking only said shunt magnetic path, a second direct current saturating winding on said core linking only said main magnetic path, a pair of direct current motor armature output terminals, the output terminals of said bridge rectifier and said direct current saturating windings being serially connected across said direct current motor output terminals whereby said direct current saturating windings are energized by armature current, an additional direct current saturating winding on said core linking only said main magnetic path and opposing said second direct current saturating winding, a pair of direct current motor field winding output terminals, and a half wave rectifier connected in series with said additional direct current saturating winding across one of said last-named output terminals and the other end of said first winding, the other of said last-named output terminal being connected to a point on said first winding.

9. A system for operating a direct current motor and for selectively controlling the speed thereof from an alternating current source, said system comprising a transformer having a core, said core having a main magnetic path and a shunt magnetic path, first winding means on said core linking both said main and shunt magnetic paths, a pair of alternating current input terminals, said first winding means being connected across said input terminals, secondary winding means on said core linking only said main magnetic path and having two parts, means for obtaining a selectively variable voltage output from said transformer, a pair of opposed half-wave rectifiers serially connecting said secondary winding parts, a first direct current saturating winding on said core linking only said shunt magnetic path, a second direct current saturating winding on said core linking only said main magnetic path, a pair of direct current motor armature output terminals, the midpoint between said rectifiers and the midpoint of one of said winding means being connected in circuit with said output terminals and said direct current saturating winding whereby said direct current saturating windings are energized in response to armature current, at least one additional direct current saturating winding on said core linking only said main magnetic path and opposing said second direct current saturating winding, and connections for impressing a fixed direct current voltage on said additional direct current saturating winding.

10. A system for operating a direct current motor and for selectively controlling the speed thereof from an alternating current source, said system comprising a transformer having a core, said core having a main magnetic path and a shunt magnetic path, a first winding on said core linking both said main and shunt magnetic paths and having two substantially equal serially connected parts, a pair of alternating current input terminals, said first winding being connected across said input terminals, means cooperating with each of said first winding parts for obtaining a selectively variable voltage from said first winding, a pair of secondary windings on said core each linking only said main magnetic path, each of said secondary windings having one end connected to said means for obtaining a selectively variable voltage thereby forming autotransformer connection of said secondary windings to said first winding, a pair of opposed half-wave rectifiers serially connecting the other ends of said secondary windings, a first direct current saturating winding on said core linking only said shunt magnetic path, a second direct current saturating winding on said core linking only said main magnetic path, a pair of direct current motor armature output terminals, the midpoint between said rectifiers and the midpoint between said first winding parts being connected in circuit with said output terminals and said direct current saturating windings whereby said direct current saturating windings are energized in response to armature current, at least on additional direct current saturating winding on said core linking only said main magnetic path and opposing said second direct current saturating winding, and connections for impressing a fixed direct current voltage on said additional direct current saturating winding.

11. A system for operating a direct current motor and for selectively controlling the speed thereof from an alternating current source, said system comprising a transformer having a core, said core having a main magnetic path and a shunt magnetic path, a first winding on said core linking both said main and shunt magnetic paths and having two substantially equal serially connected parts, a pair of alternating current input terminals, said first winding being connected across said input terminals, each of said first winding parts having a plurality of taps, a pair of tap switches respectively cooperating with the taps of said first winding parts thereby to obtain a selectively variable voltage from said first winding, a pair of secondary windings on said core each linking only said main magnetic path, each of said secondary windings having one end connected to one of said tap switches thereby forming autotransformer connections of said secondary windings to said first winding, a pair of opposed half-wave rectifiers serially connecting the other ends of said secondary windings, a first direct current saturating winding on said core linking only said shunt magnetic path, a second direct current saturating winding on said core linking only said main magnetic path, a pair of direct current motor armature output terminals, the midpoint between said rectifiers and the midpoint between said first winding parts being serially connected with said output terminals and said direct current saturating windings whereby said direct current saturating windings are energized by motor armature current, an additional direct current saturating winding on said core linking only said main magnetic path and opposing said second direct current saturating winding, an additional half-wave rectifier, and a pair of direct current motor field winding output terminals serially connected with said additional rectifier and said additional direct current saturating winding across at least a part of said first winding.

12. A system for providing an output voltage proportional to output current comprising a transformer having a core, said core having a main magnetic path and a shunt magnetic path, a pair of alternating current input terminals, a primary winding on said core linking both said main and shunt magnetic paths and connected across said input terminals, a secondary winding on said core linking only said main magnetic path, a first direct current saturating winding on said core linking only said shunt magnetic path, a second direct current saturating winding on said core linking only said main magnetic path, an output circuit connected to said secondary winding, rectifying means having its input connected in said output circuit and carrying the current flowing therein, said first and second direct current saturating windings being serially connected in circuit with the output of said rectifying means whereby said first and second direct current saturating windings are energized in response to current in said output circuit, at least one additional direct current saturating winding on said core linking only said main magnetic path and opposing said second direct current saturating winding, and connections for impressing a fixed direct current voltage on said last-named direct current saturating winding.

13. A system for obtaining an output voltage including a selectively variable voltage component and a component proportional to output current, said system comprising a transformer having a core, said core having a main magnetic path and a shunt magnetic path, first winding means on said core linking both said main and shunt magnetic paths, a pair of alternating current input terminals, said first winding means having at least a part thereof connected across said input terminals thereby forming a primary winding, means for obtaining a selectively variable voltage from said first winding means, secondary winding means on said core linking only said main magnetic path and connected in circuit with said means for obtaining a selectively variable voltage thereby forming an autotransformer connection of said secondary winding means to said primary winding means, a first direct current saturating winding on said core linking only said shunt magnetic path, a second direct current saturating winding on said core linking only said main magnetic path, an output circuit connected to said secondary and primary winding means, rectifying means having its input connected in said output circuit and carrying the current flowing therein, said first and second direct current saturating windings being serially connected in circuit with the output of said rectifying means whereby said first and second direct current saturating windings are energized in response to current in said output circuit, at least one additional direct current saturating winding on said core linking only said main magnetic path and opposing said second direct current saturating winding, and connections for impressing a fixed direct current voltage on said last-named direct current saturating winding.

No reference cited.

UNITED STATES PATENT OFFICE

CERTIFICATE OF CORRECTION

Patent No. 2,804,583                         August 27, 1957

Luther L. Genuit

It is hereby certified that error appears in the printed specification of the above numbered patent requiring correction and that the said Letters Patent should read as corrected below.

Column 2, line 22, for "Serial No. 60,078" read --Serial No. 620,078--; column 6, line 40, for "incerasing" read --increasing--; column 7, line 68, for "souce" read --source--.

Signed and sealed this 11th day of February 1958.

(SEAL)

Attest:
KARL H. AXLINE

Attesting Officer

ROBERT C. WATSON
Commissioner of Patents